(12) United States Patent
Giefer et al.

(10) Patent No.: US 8,327,732 B2
(45) Date of Patent: Dec. 11, 2012

(54) ACTUATING DEVICE HAVING A SELECTOR LEVER ACTUATOR

(75) Inventors: Andreas Giefer, Lemforde (DE); Jorg Meyer, Wagenfeld (DE); Ludger Rake, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 360 days.

(21) Appl. No.: 12/528,917

(22) PCT Filed: Mar. 4, 2008

(86) PCT No.: PCT/DE2008/000380
§ 371 (c)(1),
(2), (4) Date: Aug. 27, 2009

(87) PCT Pub. No.: WO2008/106950
PCT Pub. Date: Sep. 12, 2008

(65) Prior Publication Data
US 2010/0101353 A1    Apr. 29, 2010

(30) Foreign Application Priority Data

Mar. 7, 2007    (DE) .......................... 10 2007 011 359

(51) Int. Cl.
*G05G 5/06*    (2006.01)
(52) U.S. Cl. .................................. 74/473.23; 74/473.27
(58) Field of Classification Search ............... 74/473.12, 74/473.15, 473.21, 473.23
See application file for complete search history.

(56) References Cited

U.S. PATENT DOCUMENTS

| 4,365,522 | A  | * | 12/1982 | Kubota et al. | .............. 74/473.23 |
| 6,662,924 | B2 |   | 12/2003 | Giefer et al. | |
| 7,334,497 | B2 |   | 2/2008  | Giefer et al. | |
| 2002/0170376 | A1 | * | 11/2002 | Giefer et al. | .................... 74/532 |
| 2004/0162185 | A1 | * | 8/2004  | Giefer et al. | .................. 477/101 |
| 2004/0194567 | A1 | * | 10/2004 | Giefer et al. | ................. 74/473.3 |

FOREIGN PATENT DOCUMENTS

| DE | 100 05 167 A1 | 8/2001 |
| DE | 103 15 644 B4 | 4/2005 |
| EP | 1 318 336 A2 | 6/2003 |
| EP | 1 464 875 A2 | 10/2004 |
| WO | 01/59336 A1 | 8/2001 |

* cited by examiner

*Primary Examiner* — Troy Chambers
*Assistant Examiner* — Terence Boes
(74) *Attorney, Agent, or Firm* — Davis & Bujold, PLLC

(57) ABSTRACT

An actuating device for selecting shift positions of a shift-by-wire gear shifting transmission. The actuating device comprises a selector lever that may be moved between at least a drive position and a parking lock position, the lever having stable selector lever settings, and a locking device for locking the selector lever in the parking lock position. The locking device comprises an actuator device such that the selector lever may be moved from the drive position into the park position by way of the locking and actuator devices. The actuating device makes it possible that the position of the selector lever of the actuating device matches the actual shifting state of the transmission at all times, and thereby offers reliable optical and tactile feedback for the driver of the actual shifting state of the transmission and may also serve as a mechanical emergency actuator for the parking lock.

3 Claims, 6 Drawing Sheets

ACTUATING DEVICE HAVING A SELECTOR LEVER ACTUATOR

This application is a National Stage completion of PCT/DE2008/000380 filed Mar. 4, 2008, which claims priority from German patent application serial no. 10 2007 011 359.7 filed Mar. 7, 2007.

FIELD OF THE INVENTION

The invention relates to an actuating device for a gear shifting transmission, particularly for a shift-by-wire automatic transmission.

BACKGROUND OF THE INVENTION

Gear shifting transmissions of motor vehicles are usually controlled and/or shifted by means of an actuating device arranged within reach of the driver. Actuating elements such as shift levers or selector levers are regularly used for this purpose and are arranged, for example, between the front seats of the motor vehicle.

The design and ergonomic requirements for shift levers or selector levers of this type are manifold. For example, in order to convey a realistic sensation of operating the transmission to the driver, generic actuating devices require that the driver be provided with both optical and clear haptic or tactile feedback. Based on this, the driver is supposed to be able to deduce the occurred shifting process, and grasp the current shifting state of the transmission at a glance or by intuitively reaching for the selector lever.

In this context, it is therefore desirable to provide the driver with clear optical and haptic feedback about the current state of the transmission and/or engaged drive position by means of the respective current position or angular position of the selector lever.

In the case of a mechanical gear actuation system and/or mechanical coupling between the selector lever and the gear shifting transmission—for example by means of a control wire or linkage—the position of the selector lever always matches the actual gear setting owing to the mechanical coupling. Besides, since the gear positions are stable, the position of the selector levers is consequently also stable. As a result, on the one hand, the driver may ascertain the current shifting state of the transmission from the respective position of the selector lever and/or recognize the respectively engaged gear in the transmission from the position of the selector lever, and, on the other hand, he can be assured that the position of the selector lever never deviates from the actual shifting state of the transmission.

In the case of electrical actuation and/or shift-by-wire actuation of the gear shifting transmission, however, no mechanical coupling exists between the actuating element in the passenger compartment and the motor vehicle transmission. In the case of shift-by-wire transmissions, the shift commands are instead transmitted from the actuating device to the motor vehicle transmission exclusively by means of electric or electronic signals. This applies in part to modern manual transmissions, in particular, however, to modern generations of automatic transmissions, which usually are entirely remote-controlled by actuators.

In the case of the shift-by-wire actuated gear shifting transmissions, the missing mechanical connection between the transmission actuator system and the selector lever, however, may result in that the position of selector lever no longer matches the shifting state of the transmission under certain conditions or in the event of a malfunction.

Modern automatic transmissions, for example, generally have a so-called auto-P function, which ensures that on leaving the vehicle the parking lock is always engaged in the transmission in order to prevent the unattended vehicle from rolling away, for example. The auto-P function, which, for example, always occurs when the ignition key is removed or the vehicle is locked, in order words, ensures the automatic engagement of the parking lock independently of the drive position actually selected at the selector lever. By means of the auto-P function of the transmission and/or vehicle, the parking lock is thus also engaged if the driver, for example, in fact left the selector lever in the neutral position, or in one of the drive position settings.

In this case, however, the position of the selector lever no longer matches the actual shifting state of the transmission. When returning to the vehicle, or when starting the vehicle, the driver is thus provided with inaccurate optical as well as haptic information by the position of the selector lever. From observing the position of the selector lever, the driver assumes that the transmission is in the neutral position, or in a drive position setting, while the parking lock is in fact engaged in the transmission. This discrepancy between the position of the selector lever and the state of the transmission can thus result in undesirable operating errors, wrong conclusions by the driver, and consequently in safety-critical situations.

Attempts have been made to counteract the described problems by designing selector levers of shift-by-wire gear shifting transmissions as monostable actuating elements. In other words, this means that after each operation such a monostable selector lever always returns to the same center position. In the case of a monostable selector lever, the feedback on the actual shifting state of the transmission is thus exclusively left to a separate indicator, for example by means of light emitting diodes. In contrast, in a monostable selector lever the possibility of providing the driver with optical or haptic feedback on the shifting state of the transmission based on the position of the selector lever is omitted.

Monostable actuating devices have the additional disadvantage that the driver has to get used to a new operational concept of the lever continuously striving to return to the center position, this operational concept differing significantly from the traditional operation of the transmission.

SUMMARY OF THE INVENTION

Against this background, it is therefore the object of the present invention to accomplish an actuating device for a gear shifting transmission, by means of which the above described disadvantages present in the prior art are overcome. The invention should allow that the position of the selector lever always reflects the actual shifting state of the transmission, even in shift-by-wire-controlled gear shifting transmissions. In particular, it should prevent, with an automatically engaged parking lock, the selector lever to misleadingly remain in one of the drive position settings, while in fact the parking lock is engaged in the transmission. In this way, reliable optical and tactile feedback on the actual shifting state of the transmission should be implemented at all times.

In a manner known per se, the actuating device according to the present invention comprises a selector lever and a transmitting device for transmitting the shift commands from the actuating device to the motor vehicle transmission. In agreement with the traditional operational concept, the selector lever is configured as a control element having stable positions of the selector lever, and the actuating device furthermore comprises a locking device, with which the selector lever can be locked in the parking lock position. Locking the selector lever in the parking lock position serves to implement the safety functions that are particularly usual and/or necessary with automatic transmissions, which frequently are referred to as key lock or shift lock.

For example, the safety function in automatic gear shifting transmissions known as a so-called key lock system results in blocking the selector lever in the "P" (parking lock) position as long as the ignition key is removed. Thus, it should in particular be prevented that the selector lever is already shifted into one of the drive position before the engine is started, whereby the vehicle could undesirably start moving while it is being started. A further example of a safety function of this type is the shift lock system, which, for safety reasons, is intended to allow shifting out of the "P" (parking lock) and "N" (neutral) positions only if the brake is applied. This likewise serves the purpose of preventing uncontrolled start-up of the vehicle at the moment of engaging a drive position.

According to the invention, however, the actuating device is characterized in that the locking device comprises an actuator device, wherein the selector lever can be moved out of any drive position setting into the parking lock position by means of the locking device comprising the actuator device.

To begin with, this is constructively advantageous as far as the locking device is given a dual function in this way. The locking device can thus both be used to lock the selector lever in the parking lock position, and additionally takes over the function of the actuator-based movement of the selector lever out of the respective drive position setting into the parking lock position in the case of the automatically engaged parking lock.

If the vehicle driver thus forgot to manually engage the parking lock when parking the vehicle, the controller of the gear shifting transmission automatically engages the parking lock after the ignition key has been removed and/or the vehicle has been locked. Furthermore, the selector lever is moved out of the drive position setting last engaged into the parking lock position by means of the locking device comprising the actuator device and is locked such that the actual shifting state of the transmission ultimately matches the position of the selector lever. In this way, correct feedback on the engaged parking lock is provided to the vehicle driver under all circumstances, particularly also in the case of the parking lock being automatically engaged by the gear shifting transmission by means of the auto-P function.

In order to implement the invention, it is in the first instance not even critical how the actuator device is constructively configured, and in what way the actuator device is supplied with the corresponding actuating force for the actuator-based movement of the selector lever out of the drive position setting into the parking lock position. According to a particularly preferred embodiment of the invention, however, for this purpose, the actuator device comprises a mechanical force transmitting element for transmitting the force between an actuator arranged on the transmission side and the selector lever.

In other words, this means that actuation of the actuator device, and consequently also actuator-based movement of the selector lever according to this embodiment, is carried out directly by the gear shifting transmission, for example by means of an actuator for the parking lock provided on the transmission side. Thanks to this embodiment, a particularly simple configuration of the actuator device for the actuating device is achieved, since no dedicated actuator with the corresponding energy supply in the region of the selector lever is required. Furthermore, high reliability is ensured with this embodiment, even in case of a failure of the electrical systems, since the selector lever according to this embodiment is moved mechanically from the transmission into the parking lock position via the force transmitting element when the transmission carries out the auto-P command.

To this end, the mechanical force transmitting element is preferably configured as a control wire, whereby simple, flexible laying and particularly low structure-borne noise transmission are achieved compared to a rigid linkage or a pushed wire actuation.

According to a further preferred embodiment of the invention, it is provided that the actuating device comprises a unit for mechanical emergency actuation of the gear shifting transmission, particularly for releasing the parking lock in the event of a failure of the gear actuation system. In this case, in the event of emergency actuation, the force transmission from the selector lever to the gear shifting transmission is carried out via the locking device of the actuating device that comprises the actuator device and the mechanical force transmitting element.

Thanks to this embodiment of the invention, many particularly advantageous multiple uses of locking device are constructively possible, and therefore also of the actuator device and of the mechanical force transmitting element. Because, on the one hand, the selector lever may thus both be locked in the parking lock position by the locking device and, in the event of an emergency actuation, a force may be transmitted from the selector lever to the gear shifting transmission via the locking device. The actuator device as well as the force transmitting element are thus likewise used in two ways, as, on the one hand, the force is transmitted from the transmission to the selector lever via the actuator device and force transmitting element—for the case in which the parking lock position of the selector lever is automatically engaged—and vice versa—in case of emergency actuation—the actuating force is transmitted from the selector lever to the transmission.

According to a further, likewise preferred, embodiment of the invention, the locking device comprises an actuator for releasing the selector lever locked in the parking lock position. Thanks to this embodiment, the release of the selector lever out of the parking lock position may easily be linked to the corresponding vehicle safety logic, particularly to the sensing of the ignition key position and/or brake pedal application. This means in other words that, for safety reasons, the locking device of the selector lever is locked in or released from the parking lock position by the vehicle safety logic, depending on whether the ignition key is inserted or removed, or whether the driver has applied the brakes.

According to a further preferred embodiment of the invention, the locking device comprises a locking rocker that is tiltable about a pivot point. In this case, the pivot point of the locking rocker in turn is pivot-mounted to a base of the actuating device by means of a pivoted lever. The locking rocker at one end has a first locking contour that may be coupled with the selector lever and at the other end a second locking contour that may be coupled with the emergency release.

In this way, using an absolute minimum of components, it is possible to cancel the locking action of the locking rocker on the selector lever in two different ways. Thus, either the first locking contour of the locking rocker blocking the selector lever in the parking lock position may be detached from the selector lever by means of a tilting motion of the locking rocker about its pivot point, and the selector lever may thus be released. The tilting motion of the locking rocker required for this purpose may be induced, for example, by pressing the parking lock button at the selector lever and/or by means of the actuator of the locking device.

Alternatively, the second locking contour arranged at the other end of the locking rocker may be disengaged from the emergency release and/or the corresponding base of the actuating device by means of manual actuation. In this way, both the second locking contour and the entire locking rocker, and also the pivoted lever supporting the locking rocker, may be released. While in this case the first locking contour of the locking rocker still remains coupled with the selector lever, the selector lever may, however, be moved out of the parking lock position together with the locking rocker and pivoted lever. In this way, the desired emergency actuation, and particularly the manual disengagement of the parking lock, may be carried out, for example in the event of a failure of the electrical systems.

In this connection, the pivoted lever is preferably connected to the mechanical force transmitting element between the gear shifting transmission and the selector lever. This enables reliable actuator-based movement of the selector lever out of the drive position setting into the parking lock position. Starting from the gear shifting transmission—and/or starting from a transmission actuator for actuating the parking lock pawl in the transmission—this actuator-based actuation of the selector lever is applied via the mechanical force transmitting element and via the pivoted lever, locking rocker, and first locking contour onto the selector lever. Thus, in this embodiment of the invention, the pivoted lever, together with the locking rocker and together with the mechanical force transmitting element, forms the actuator device for actuating the selector lever.

According to a further embodiment of the invention, it is provided that starting from the operating position of the pivoted lever, this lever is spring-loaded in the direction of its parking lock position by means of an energy accumulator. To this end, when the parking lock is disengaged in the gear shifting transmission, the pivoted lever is blocked in its operating position by the mechanical force transmitting element, whereas when the parking lock is engaged in the gear shifting transmission, the pivoted lever is not blocked and thus released by the mechanical force transmitting element.

Thanks to this embodiment, the pivoted lever may still remain in its operating position (in which position the pivoted lever and the locking rocker do not yet lock the selector lever in the parking lock position), and therefore the selector lever may also remain in a drive position setting, while, on the other hand, the gear shifting transmission may already automatically take the parking lock setting. This is the case, for example, if the selector lever is still being held by the vehicle driver, or is blocked by a piece of luggage, while the gear shifting transmission is already moving into the parking lock position, for example because the ignition key has already been removed. As soon as the selector lever is subsequently released, or the blockade of the selector lever is removed, the selector lever may automatically move into the parking lock position due to the spring-loaded pivoted lever. This embodiment of the invention is particularly in the service of safety, since in this way the parking lock may automatically be engaged by the transmission even if the selector lever should be blocked, for example, by an object in a drive position setting.

This embodiment is also advantageous in that engagement of the parking lock by the transmission is generally implemented via a spring actuator. If not, only the parking lock pawl should be engaged by this spring actuator, but also the selector lever should be tracked into the parking lock position, a power support function would possibly be required on the transmission side since the energy stored in the spring actuator of the transmission actuator may possibly not be sufficient for the additional movement of the selector lever. This is all the more so, if the selector lever is still retained or blocked by an object during the automatic retraction of the parking lock. According to this embodiment, however, the selector lever in the form of the spring-loaded pivoted lever has a dedicated energy accumulator for moving the selector lever into the parking lock position, and this should not additionally pose a strain on the spring actuator of the transmission actuator.

During the subsequent release of the parking lock in the transmission—prior to the next time driving is resumed—the energy accumulator of the pivoted lever may again be pre-stressed via the mechanical force transmitting element between the actuator on the transmission side and the actuating device, while the pivoted lever is again seized by the mechanical force transmitting element in its parking lock position, moved into its operating position and is again blocked in this position by the mechanical force transmitting element. For this purpose, sufficient actuating energy is available from the transmission, since disengagement of the parking lock in the transmission is usually carried out hydraulically. Thus, the necessary actuating energy is again transmitted from the transmission actuator to the actuating device, and stored there for the next actuator-based actuating step of the selector lever in the event of the activation of the auto-P function.

Based on this background, it is provided according to another embodiment of the invention that the actuating device comprises a manually operable locking device for connecting the mechanical force transmitting element to the spring-loaded pivoted lever.

In this way, the above described dual function of the mechanical force transmitting element is implemented in a simple manner, also in the embodiment having the spring-loaded pivoted lever. The mechanical force transmitting element is thus available both for operating the selector lever by the gear shifting transmission with a direction of force from the transmission actuator to the selector lever—also for the case of the spring-loaded pivoted lever—and for the emergency operation of the parking lock by means of the selector lever—with a reverse direction of force from the selector lever to the transmission actuator.

In case of emergency actuation, the spring-loaded pivoted lever is connected to the mechanical force transmitting element by means of the locking device, and the emergency release of the locking rocker is triggered at the same time. Subsequently, emergency actuation of the parking lock may be carried out by means of force transmission from the selector lever along the force transmitting chain of "selector lever, first locking contour, locking rocker, pivoted lever, locking device, mechanical force transmitting element, transmission actuator" to the gear shifting transmission.

BRIEF DESCRIPTION OF THE DRAWINGS

The invention will be described hereafter in more detail with reference to exemplary embodiments illustrated in the drawings. The drawings show.

DETAILED DESCRIPTION OF THE PREFERRED EMBODIMENTS

Figure 1:
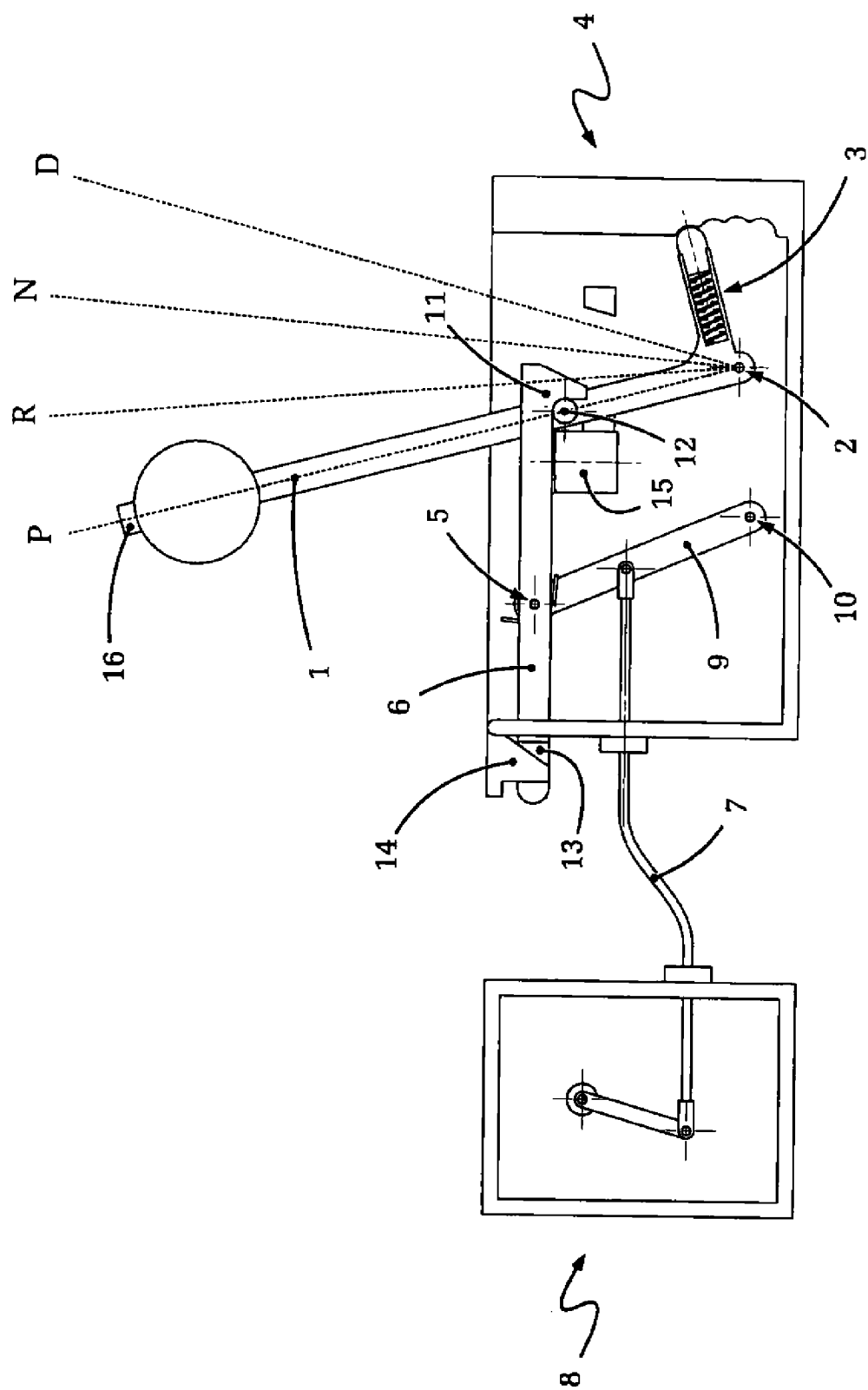
FIG. 1 a schematic side view of the embodiment of an actuating device according to the present invention.
Figure 2:
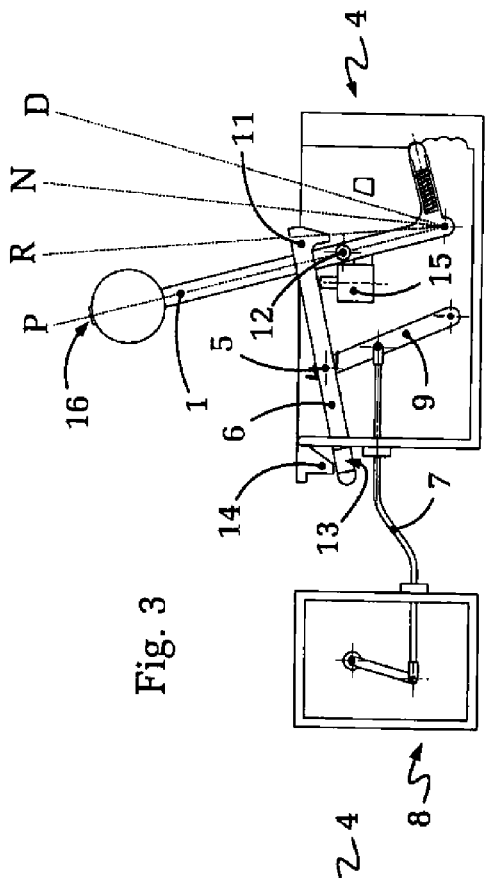
FIG. 2 an illustration and view corresponding to FIG. 1 of the actuating device according to FIG. 1 with the selector lever still locked and a locked emergency release.

FIG. 1 shows, in a highly schematic side view, an embodiment of an actuating device according to the invention.

To begin with, a selector lever 1 is apparent, which is arranged in a housing base 4 of the actuating device movably between different positions of the selector lever or drive positions P, R, N, D via a pivot point 2 and by means of a spring-loaded catch mechanism 3.

The illustrated actuating device furthermore comprises a locking device, by means of which the selector lever 1 may be locked in the parking lock position P. In the illustrated embodiment, the locking device comprises a locking rocker 6 mounted in a spring-loaded manner in a pivot point 5 and a pivoted lever 9, which is connected by means of a control wire 7 to the gearshift shaft and/or the transmission actuator 8 of a gear shifting transmission (not shown) and which is in turn pivotally connected via a further pivot point 10 to the housing base 4 of the actuating device.

The locking rocker 6 has a first locking contour 11, which may be in communication with a locking cam 12 arranged on the selector lever 1, and a second locking contour 13, which is configured as a recess and may be in communication with an emergency release flap 14 pivotally arranged at the housing base 4. For releasing the locking rocker 6, the actuating device shown comprises an actuator 15, which is an electromagnetic actuator in the exemplary embodiment, which may be activated via the push button 16 arranged at the selector lever 1.

FIGS. 2 to 9 show the different sequences when operating the actuating device from FIG. 1 in detail. The illustration of FIG. 2 again corresponds to the starting position of the actuating device as is shown in FIG. 1. The selector lever 1 is in the parking lock position, and the gearshift shaft or the transmission actuator 8 of the gear shifting transmission is in the parking lock position, the latter meaning that the parking lock is engaged in the transmission.

The ignition key of the vehicle is assumed to be removed, which is why the selector lever 1—as a result of the key lock system of the motor vehicle—is locked in the parking lock position by means of the locking rocker 6. To this end, the locking rocker 6 engages behind the locking cam 12 arranged at the selector lever 1 by means of the first locking contour 11. At the same time, the emergency release flap 14 communicates with the second locking contour 13 of the locking rocker 6 configured as a recess, and in this way locks the locking rocker 6 to the housing base 4 of the actuating device. According to the illustration in FIG. 2, the selector lever 1 can thus not be moved out of the parking lock position.

Figure 3:
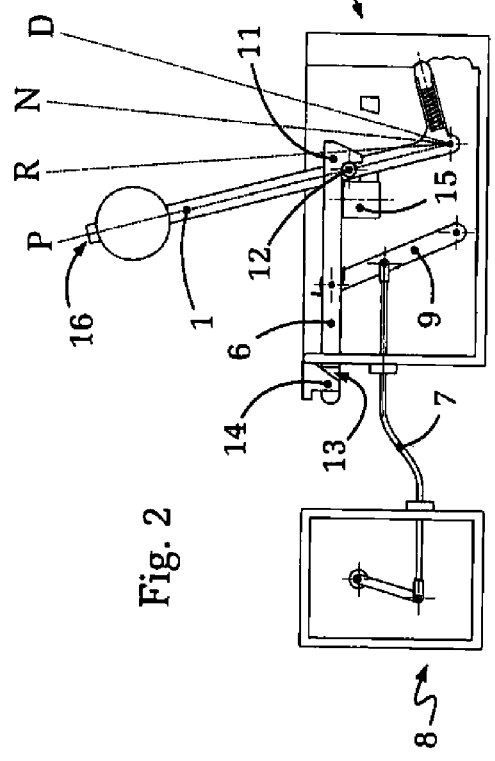
FIG. 3 an illustration and view corresponding to FIGS. 1 and 2 of the actuating device according to FIGS. 1 and 2 while opening the locking rocker with the magnetic actuator.
Figure 4:
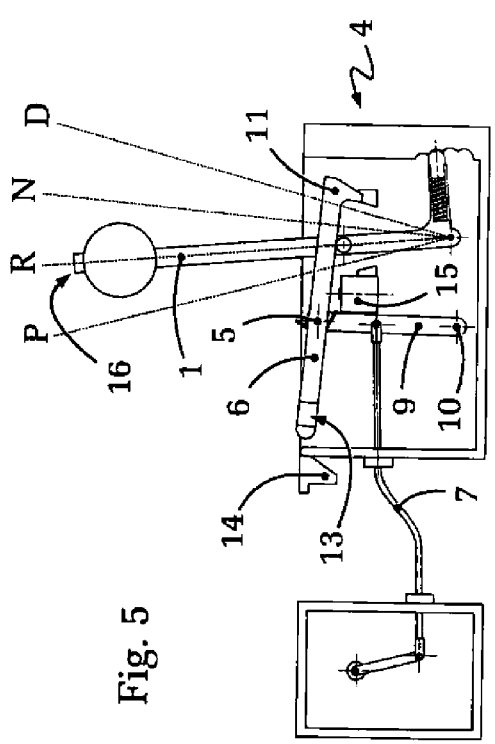
FIG. 4 an illustration and view corresponding to FIGS. 1 to 3 of the actuating device according to FIGS. 1 to 3 during engagement of a drive position at the selector lever.
Figure 5:
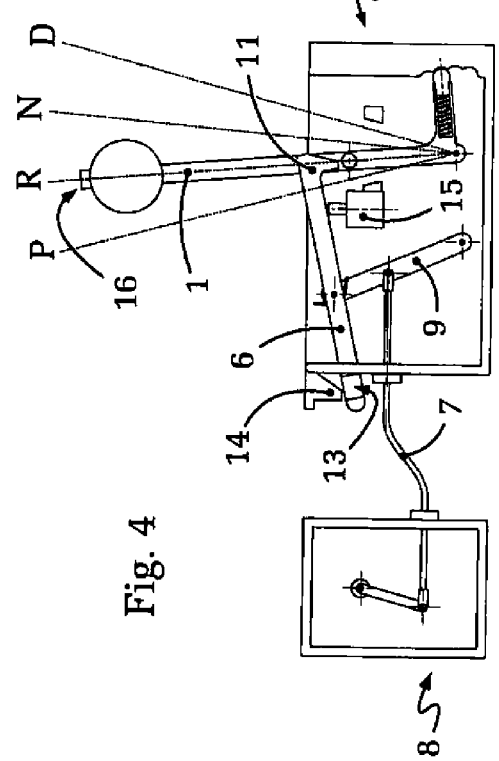
FIG. 5 an illustration and view corresponding to FIGS. 1 to 4 of the actuating device according to FIGS. 1 to 4 during the disengagement of the parking lock by the transmission actuator.

The release of the parking brake during normal operation is shown in FIGS. 3 to 5. To this end, the ignition on the vehicle has first to be turned on and the brake applied in order to thus release both the key lock as well as the shift lock mechanisms of the transmission safety logic, which are intended to prevent accidental unlocking of the parking lock or movement of the vehicle.

According to FIG. 3, the driver then operates the push button 16 at the selector lever 1, as a result of which the electromagnetic actuator 15 is activated, and the locking rocker 6 is thus pivoted or lifted about the pivot point 5 arranged at the pivoted lever 9. The first locking contour 11 of the locking rocker 6 thus releases the locking cam 12 of the selector lever 1, whereupon the selector lever 1 may be moved out of the parking lock position into one of the drive position settings R, N, or D.

The latter is shown in FIG. 4. The selector lever 1 was moved out of the parking lock position into the drive position setting R. The positions of the gearshift shaft and/or transmission actuator 8 at the transmission, and also the positions of the locking rocker 6, the pivoted lever 9, and the electromagnetic actuator 15 are initially unchanged.

The sensor system (not shown) of the selector lever 1 or of the actuating device, however, has detected the shift command from P to R and transmitted it to the transmission actuator system. Accordingly, the corresponding drive position is engaged in the transmission; however, the transmission actuator 8 first releases the parking lock pawl in the transmission, which is usually carried out hydraulically.

After the actuator-based parking lock is released in this way, the situation shown in FIG. 5 results. The gearshift shaft and/or the transmission actuator 8 has changed its position according to the disengaged parking lock such that operation of the control wire 7, and thereby pivoting of the pivoted lever 9 together with the locking rocker 6 connected to the pivoted lever 9 about the pivot point 10 is carried out in this way. Approximately at the same time, the transmission controller ensures deactivation of the electromagnetic actuator, and thereby clockwise tilting of the locking rocker 6 about the pivot point 5, as a result of which the operating position of the pivoted lever 9 and locking rocker 6 according to FIG. 5 is obtained, which the pivoted lever 9 and locking rocker 6 maintain during normal driving of the motor vehicle.

Figure 6:
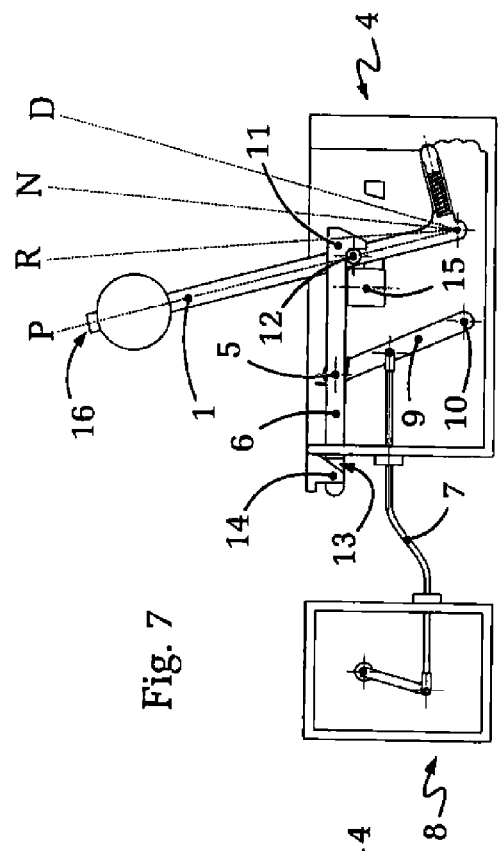
FIG. 6 an illustration and view corresponding to FIGS. 1 to 5 of the actuating device according to FIGS. 1 to 5 before starting the automatic selector lever return by the transmission actuator.
Figure 7:
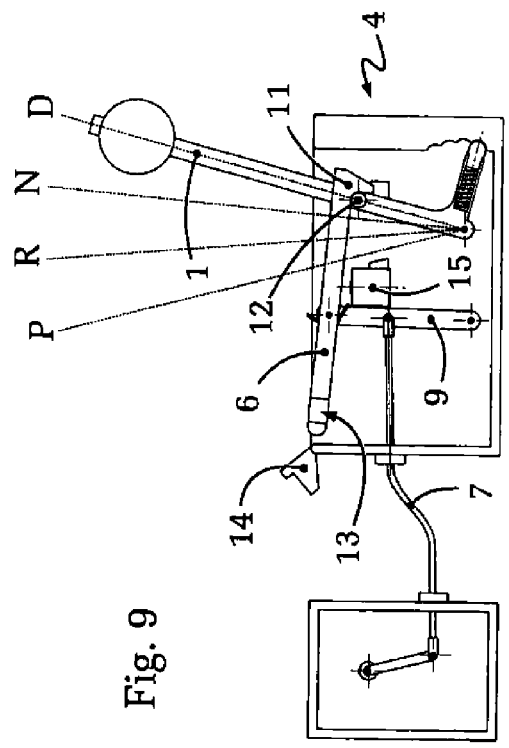
FIG. 7 an illustration and view corresponding to FIGS. 1 to 6 of the actuating device according to FIGS. 1 to 5 during the automatic selector lever return by the transmission actuator.

FIGS. 6 and 7 show the sequences during the automatic activation of the parking lock ("auto-P"). According to the illustration in FIG. 6, the selector 1 is at first (for example) still in the drive position D. The transmission actuator 8, control wire 7, pivoted lever 9, and locking rocker 6 according to FIG. 6 are still unchanged in the operating position, which is also shown in FIG. 5.

Afterwards, the vehicle would be parked and left by the driver having, however, neglected to manually engage the parking lock. The transmission controller therefore starts the automatic activation of the parking lock according to the illustration in FIG. 7. During the retraction of the parking lock pawl, the position of the gearshift shaft and/or of the transmission actuator 8 at the gear shifting transmission changes accordingly. As a result, however, also (pulling) actuation of the control wire 7 takes place, and thus pivoting of the pivoted lever 9 about its pivot point 10 to the left with respect to the drawing.

In the process, the pivoted lever 9 takes along the locking rocker 6 connected to the pivoted lever 9 at 5, and in this way also moves the selector lever 1 to the left with respect to the drawing via the first locking contour 11 of the locking rocker 6 and via the locking cam 12 until the selector lever 1 has reached the parking lock position. At the same time, the second locking contour 13 of the locking rocker 6 snaps into the emergency release flap 14 arranged at the housing base 4, as a result of which the arrangement consisting of the locking rocker 6, pivoted lever 9, selector lever 1, control wire 7 and transmission actuator 8 is locked in the position according to FIG. 7—which again corresponds to the starting position according to FIGS. 1 and 2.

Subsequently, the parking lock may again be released in normal operation, as is shown above by means of FIGS. 3 to 5 and the associated description.

Figure 8:
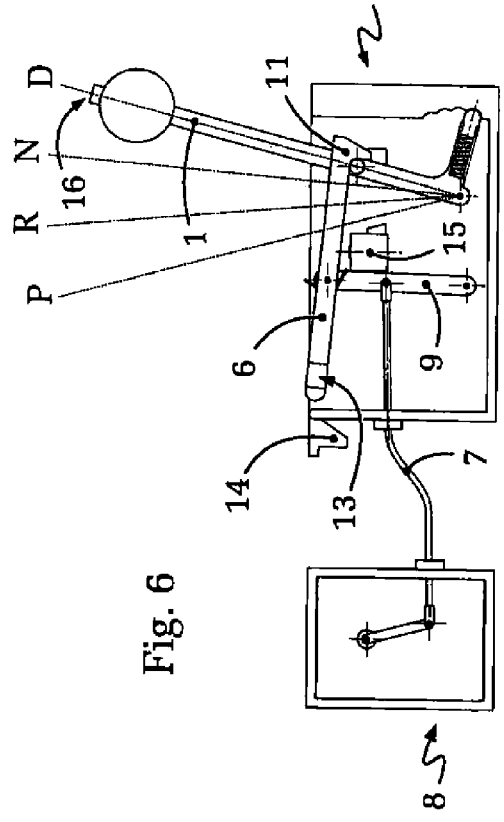
FIG. 8 an illustration and view corresponding to FIGS. 1 to 7 of the actuating device according to FIGS. 1 to 7 during the actuation of the emergency release for the parking lock.

If, during a failure of the electrical systems of the motor vehicle, the parking lock is for example no longer releasable in the usual manner by turning on the ignition, applying the brake, and pressing the push button 16 at the selector lever with a subsequent movement of the selector lever 1 out of the parking lock position into a drive position setting, the illustrated actuating device also enables an emergency release of the parking lock. This is illustrated in FIGS. 8 and 9.

In the event that electrical systems of the motor vehicle, and therefore in particular pivoting and release of the locking rocker 6 by means of the electromagnetic actuator 15 fail, the locking rocker 6 may also be released mechanically by hand. To do so, the emergency release flap 14 pivotally arranged at the housing base 4 of the actuating device is lifted, whereby the emergency release flap 14 is disengaged from the second locking contour 13 of the locking rocker 6 configured as a recess, as is shown in FIG. 8.

Figure 9:
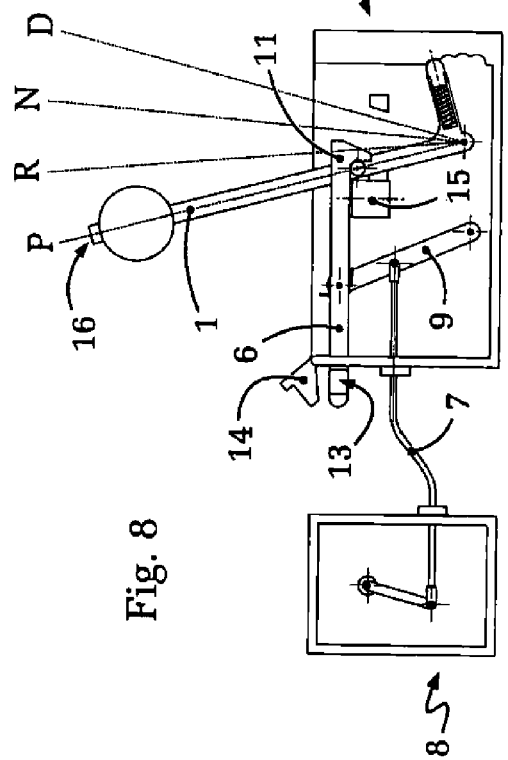
FIG. 9 an illustration and view corresponding to FIGS. 1 to 8 of the actuating device according to FIGS. 1 to 8 during the manual disengagement of the parking lock via the control wire.

Subsequently, the selector lever 1 may be moved out of the parking lock position into one of the drive position settings, as is shown in FIG. 9. Due to the unchanged meshing of the first locking contour 11 of the locking rocker 6 with the locking cam 12 at the selector lever 1, the locking rocker 6, the pivoted lever 9, and the control wire 7 as well as the gearshift shaft and/or the transmission actuator 8 track this manual pivoting movement of the selector lever 1.

In this way, the parking lock pawl in the transmission is disengaged purely mechanically via the functional chain "selector lever, locking rocker, pivoted lever, control wire, gearshift shaft", and the vehicle may thus be moved again, towed, for example.

Figure 10:
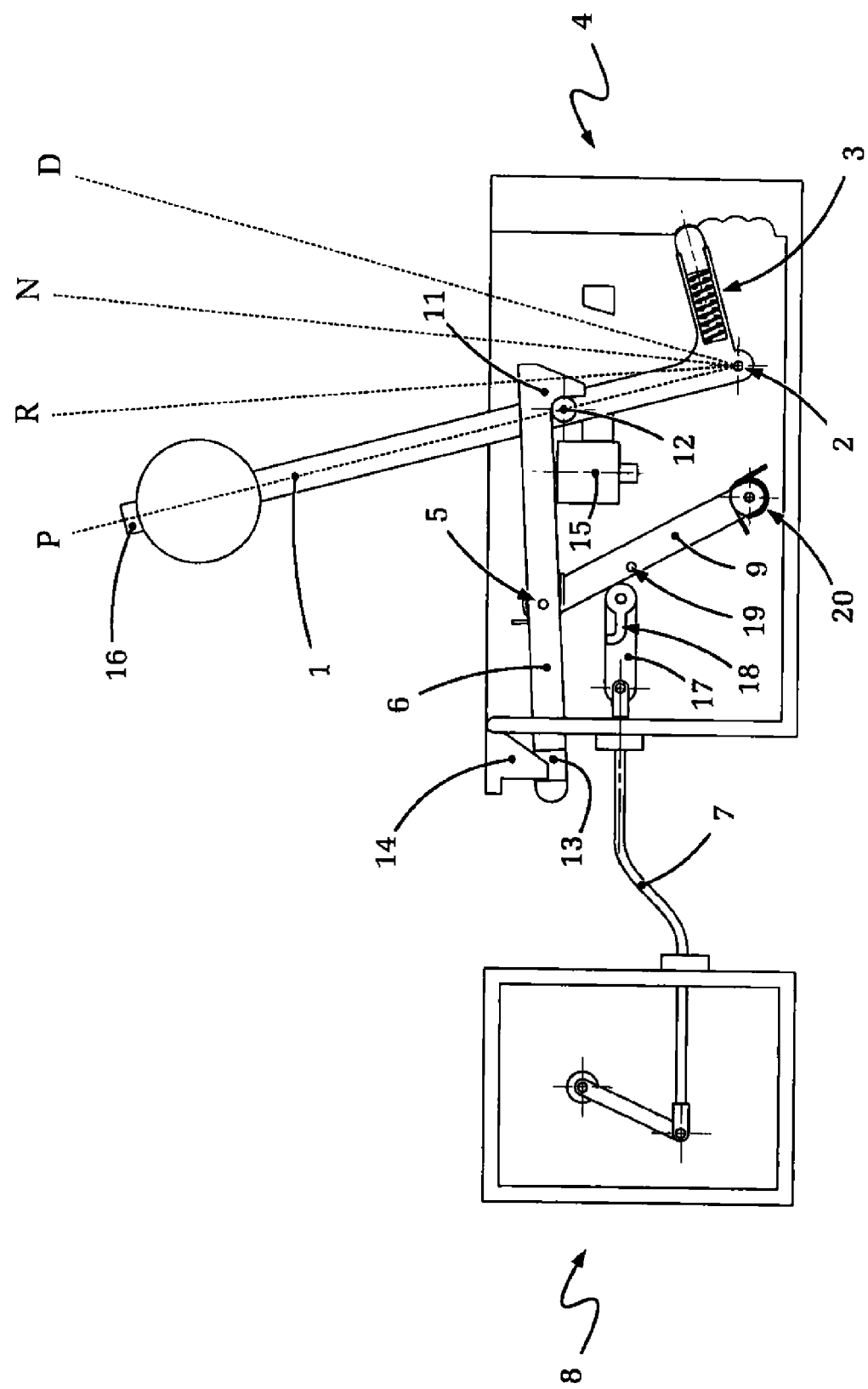
FIG. 10 a schematic side view of a further embodiment of an actuating device according to the present invention.

FIG. 10 shows a further embodiment of an actuating device according to the present invention.

The selector lever 1 is again apparent, which is arranged in the housing base 4 of the actuating device movable between different positions of the selector lever and/or drive positions P, R, N, D via the pivot point 2 and the spring-loaded catch mechanism 3.

In this embodiment, a locking device for locking the selector lever 1 in the parking lock position P is also present. In the illustrated embodiment, the locking device again comprises the locking rocker 6 mounted in the pivot point 5 as well as the pivoted lever 9, which is connected by means of the control wire 7 to the gearshift shaft and/or the transmission actuator 8 of the gear shifting transmission.

The locking rocker 6 again has a first locking contour 11, which may be coupled with the locking cam 12 arranged on the selector lever 1, as well as the second locking contour 13, which is configured as a recess and may be coupled with an emergency release flap 14 pivotally arranged at the housing base 4. For unlocking the locking rocker 6, the shown actuating device again comprises the magnetic actuator 15, which may be activated via the push button 16 arranged at the selector lever 1.

Unlike the embodiment according to FIG. 1 to 9, the control wire 7 is not firmly connected to the pivoted lever 9 in the embodiment according to FIG. 10. Here, the control wire 7 rather ends in a pressure piece 17, which carries a pivotable lock hook 18. The lock hook 18 may be meshed with a lock lug 19 arranged at the pivoted lever 9. At the same time, the pivoted lever 9 in the embodiment according to FIG. 10 is impinged counterclockwise with a spring force by means of a helical spring 20.

In FIGS. 11 to 16 the sequences when controlling the actuating device from FIG. 10 are shown in detail. The illustration of FIG. 11 corresponds to the starting position of the actuating device, which is also shown in FIG. 10. According to FIG. 11, the selector lever 1 is again in the parking lock position first, and the gearshift shaft or the transmission actuator 8 of the gear shifting transmission is likewise in the parking lock position, the latter meaning that the parking lock pawl is engaged in the transmission.

The ignition key of the vehicle is again assumed to be removed, which is why the selector lever 1 is initially locked in the parking lock position by means of the locking rocker 6. To achieve this, the locking rocker 6 engages behind the locking cam 12 arranged at the selector lever 1 by means of the first locking contour 11. At the same time, the emergency release flap 14 again engages in the second locking contour 13 of the locking rocker 6 configured as a recess, and in this way locks the locking rocker 6 to the housing base 4 of the actuating device. According to the illustration in FIG. 11, the selector lever 1 is thus mechanically locked in the parking lock position.

Figure 13:
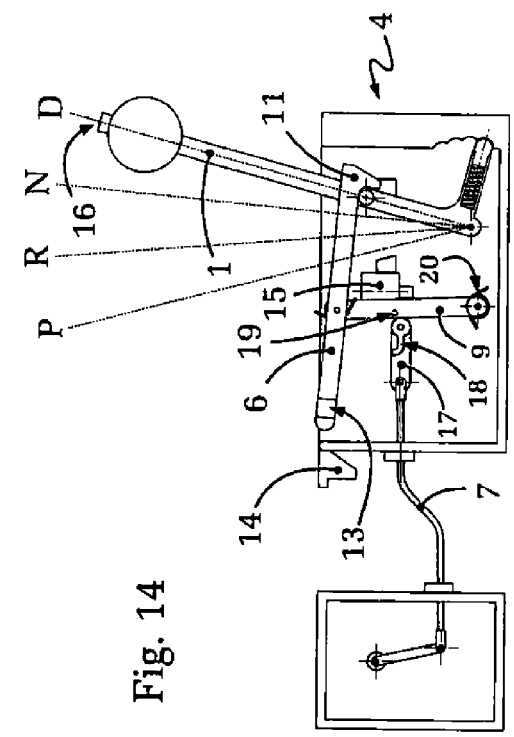
FIG. 13 an illustration and view corresponding to FIGS. 10 to 12 of the actuating device according to FIGS. 10 to 12 during engagement of a drive position at the selector lever and during the disengagement of the parking lock by the transmission actuator.
Figure 12:
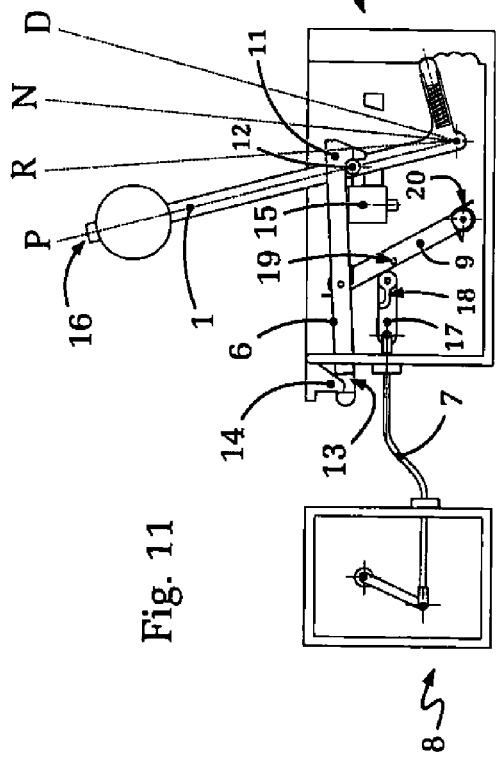
FIG. 12 an illustration and view corresponding to FIGS. 10 and 11 of the actuating device according to FIGS. 10 and 11 while opening the locking rocker with the magnetic actuator.

The release of the parking brake during normal operation is shown in FIGS. 12 and 13. In order to release the parking lock, the ignition has to be again first turned on at the vehicle and the brake applied in order to thus release the key lock and the shift lock mechanisms, which are intended to prevent accidental releasing of the parking lock and/or movement of the vehicle.

According to FIG. 12, the driver subsequently again actuates the push button 16 at the selector lever 1, whereby the electromagnetic actuator 15 is activated and thus the locking rocker 6 is pivoted about the pivot point 5 arranged at the pivoted lever 9. As a result, the first locking contour 11 of the locking rocker 6 releases the locking cam 12 of the selector lever 1, whereupon the selector lever 1 may be moved out of the parking lock position into one of the drive position settings R, N, or D.

In the illustration according to FIG. 13, the selector lever 1 released in this way has already been moved out of the parking lock position into a drive position setting. The associated shift command from P to R was detected by the sensor system (not shown) of the actuating device and transmitted to the transmission actuator system. Accordingly, the corresponding drive position has already been engaged in the transmission, and the parking lock pawl in the transmission has been hydraulically released by the transmission actuator 8 of the transmission.

During disengagement of the parking lock, or during engagement of the drive position, however, the position of the gearshift shaft or of the transmission actuator 8 also changes, which in turn results in actuating the control wire 7. Due to actuation of the control wire 7, the pressure piece 17 is moved to the right with respect to the drawing, which is why due to the contact of the pressure piece 17 with the pivoted lever 9, the pivoted lever 9 together with the locking rocker 6 is also pivoted about the pivot point 10 to the right, and in the process the helical spring 20 is also pre-stressed. Sufficient force and/or actuating energy is available for pre-stressing the helical spring 20, since the parking lock pawl is usually disengaged hydraulically in modern automatic transmissions. At the same time, the transmission controller deactivates the electromagnetic actuator 15, whereby the locking rocker 6 tilts clockwise about the pivot point 5. In this way, the operating positions of the locking rocker 6 and the pivoted lever 9 according to FIG. 13 are obtained, the locking rocker 6 and pivoted lever 9 maintaining their operating positions according to FIG. 13 during normal driving of the motor vehicle.

Figure 14:
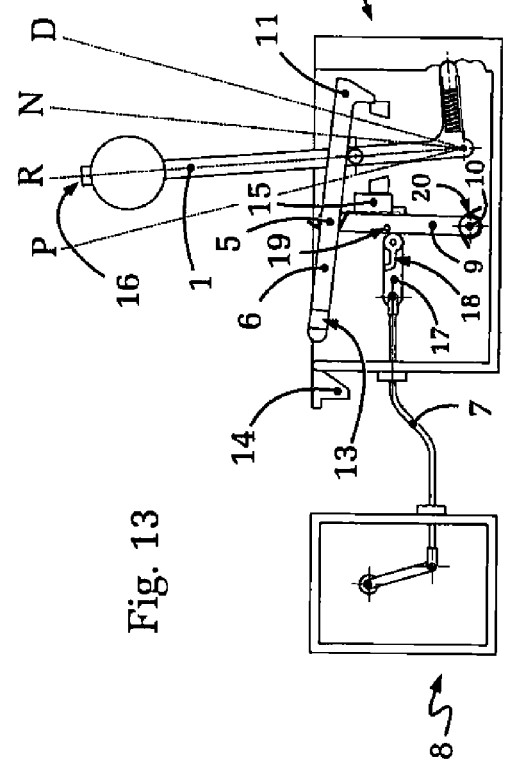
FIG. 14 an illustration and view corresponding to FIGS. 10 to 13 of the actuating device according to FIGS. 10 to 13 before the starting the automatic selector lever return by the transmission actuator.
Figure 15:
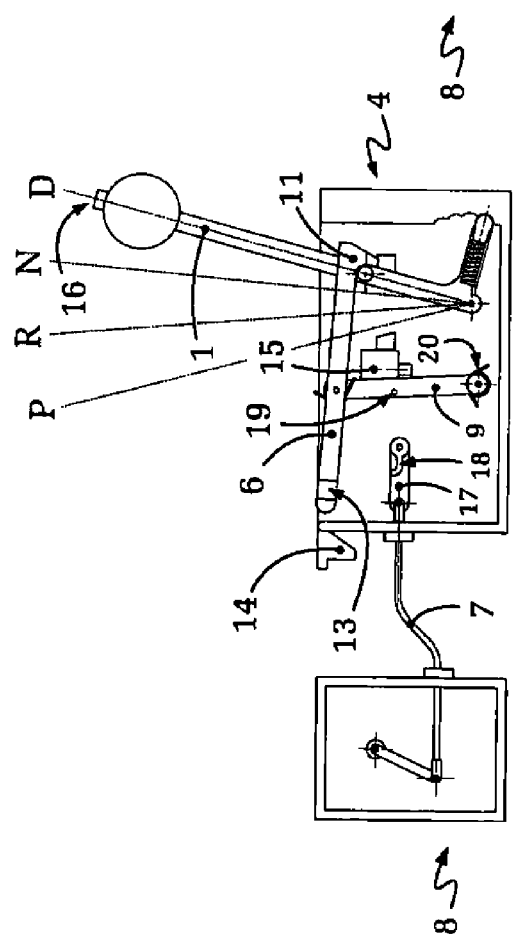
FIG. 15 an illustration and view corresponding to FIGS. 10 to 14 of the actuating device according to FIGS. 10 to 14 during the automatic engagement of the parking lock.

FIGS. 14 and 15 show the sequences during automatic activation of the parking lock ("auto-P") for this embodiment of the actuating device. According to the illustration in FIG. 14, the selector 1 would initially be still in the drive position setting D. The transmission actuator 8, control wire 7, pivoted lever 9, and locking rocker 6 according to FIG. 14 would still be unchanged in the operating position, as is also shown in FIG. 13.

Afterwards, the vehicle would be shut off and left by the driver, but the driver would have neglected to manually engage the parking lock. The transmission controller therefore starts the automatic activation of the parking lock according to the illustration in FIG. 15. During retraction of the parking lock pawl, the position of the gearshift shaft and/or of the transmission actuator 8 at the gear shifting transmission changes accordingly. The result is a pulling actuation of the control wire 7, whereby the pressure piece 17 is moved to the left with respect to the drawing and moved out of its contact with the pivoted lever 9.

It is apparent that—unlike in the embodiment according to FIGS. 1 to 9—in this example, the transmission controller can thus trigger the auto-P function and automatically engage the parking lock at the transmission, even if the selector lever 1 would still be retained in a drive position setting, or blocked in this setting, for example, by an object. If the blockade of the selector lever 1 is later removed, the selector lever 1 may subsequently return into the parking lock position due to the pivoted lever 9 having been spring loaded by the helical spring 20 previously pre-stressed by the transmission actuator via the functional chain "helical spring, pivoted lever, locking rocker, first locking contour".

Figure 11:
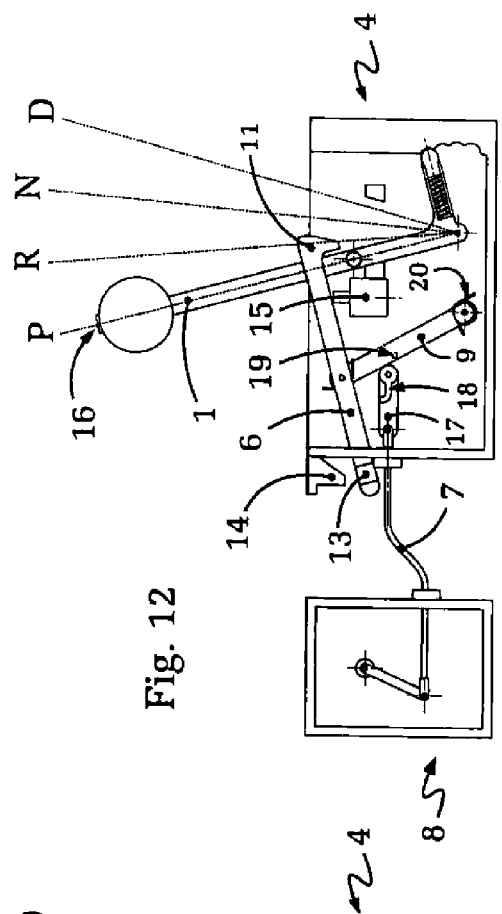
FIG. 11 an illustration and view corresponding to FIG. 10 of the actuating device according to FIG. 10 again with the selector lever still locked and a locked emergency release.

At the same time, the second locking contour 13 of the locking rocker 6 again snaps into the emergency release flap 14 arranged at the housing base 4, whereby, subsequent to the situation according to FIG. 15, the movable arrangement of the locking rocker 6, pivoted lever 9, selector lever 1, control wire 7 and transmission actuator 8 again reaches the starting position according to FIGS. 10 and 11 and is locked in this position.

The release of the parking lock during normal operation can then again take place, as illustrated above by means of the description of FIGS. 12 and 13.

Figure 16:
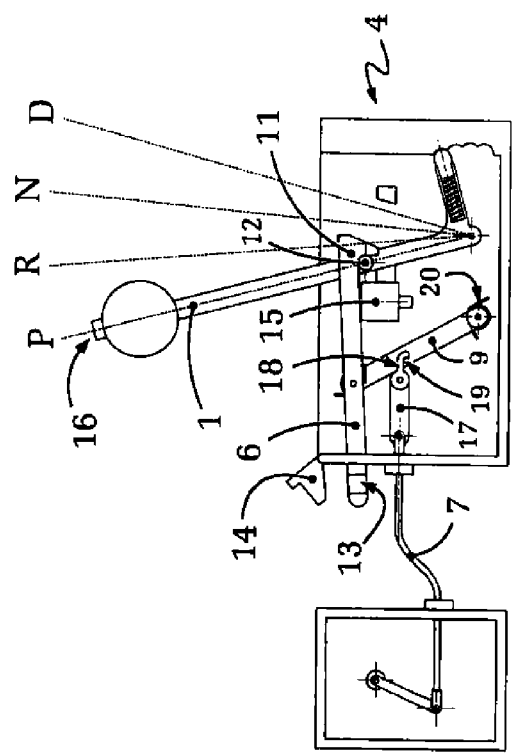
FIG. 16 an illustration and view corresponding to FIGS. 10 to 15 of the actuating device according to FIGS. 10 to 15 during the actuation of the emergency release for the parking lock.

If the parking lock, particularly during a failure of electrical systems of the motor vehicle, should no longer be releasable in the usual manner by turning on the ignition, applying the brake, and pressing the push button 16 at the selector lever, with a subsequent movement of the selector lever 1 out of the parking lock position, the actuating device according to FIGS. 10 to 16 also enables the emergency release of the parking lock, as shown in FIG. 16.

In the event of a failure of the actuator-based pivoting and resulting release of the locking rocker 6 by means of the electromagnetic actuator 15, the locking rocker 6 may again be released mechanically by hand. To do so, the emergency release flap 14 pivotally arranged at the housing base 4 of the actuating device is lifted, whereby the emergency release flap 14 is disengaged from the second locking contour 13 of the locking rocker 6 configured as a recess, as shown in FIG. 8. At the same time, the lock hook 18 arranged on the pressure piece 17 is engaged in the lock lug 19 arranged at the pivoted lever 9.

Subsequently, according to the illustration of FIG. 16, the selector lever 1 may be moved out of the parking lock position into one of the drive position settings. Due to the unchanged engagement of the first locking contour 11 of the locking rocker 6 in the locking cam 12 at the selector lever 1, the locking rocker 6, the pivoted lever 9, the pressure piece 17, and the wire control 7 as well as the gearshift shaft and/or the transmission actuator 8 follow this manual pivoting movement of the selector lever 1.

In this way, the parking lock pawl in the transmission is again disengaged purely mechanically via the functional chain "selector lever, locking rocker, pivoted lever, wire control, gearshift shaft", and the vehicle may thus be moved again, for example towed.

As a result, it is apparent that the invention accomplishes an actuating device for motor vehicle transmissions, which, compared to the prior art, particularly has the advantage that the position of the selector lever matches the actual shifting state of the transmission at all times. In this way, the invention enables reliable optical and tactile feedback for the driver on the actual shifting state of the transmission. The device used for the automatic movement of the selector lever may also be implemented without a complex electromechanical actuator system on the selector lever and, constructively, may in addition be advantageously used as a selector lever lock, and also as a mechanical emergency actuator of the parking lock.

The invention thus makes a considerable contribution to the improvement of ergonomics and safety in the field of actuating devices for motor vehicle transmissions, particularly in the case of demanding applications in the field of automatic transmissions.

REFERENCE NUMERALS

1 Selector lever
2 Pivot point
3 Catch mechanism

4 Housing base
5 Pivot point
6 Locking rocker
7 Wire control, force transmitting element
8 Transmission actuator, gearshift shaft
9 Pivoted lever
10 Pivot point
11 First locking contour
12 Locking cam
13 Second locking contour
14 Emergency release flap
15 Actuator
16 Push button
17 Pressure piece
18 Lock hook
19 Lock lug
20 Helical spring

The invention claimed is:

1. An actuating device for selecting a control stage of a shift-by-wire gear shifting transmission, the actuating device comprising:
   a selector lever (1) being pivotable, about a pivot point (5), between a plurality of stable selector settings (P, R, N, D) including at least one stable drive position and a stable parking lock position, the selector lever (1) having a spring loaded catch mechanism (3) that communicates with a contoured surface to provide tactile response to the pivot position of the selector lever (1), the selector lever (1) further having a locking cam (12);
   a locking rocker (6) being pivotally coupled to an end of a pivoting lever (9) to pivot between a locked position and an unlocked position, the locking rocker (6) having a first end (11) with a locking contour that, when in the locked position, is engagable with the locking cam (12) of the selector lever (1), and an opposite second end (13) with a locking contour that is engagable with an emergency release (14);
   a control wire (7) comprising a lock hook (18) which pivots to releasably engage a lock lug (19) of the pivoting lever (9), between the end of the pivoting lever (9) coupled to the locking rocker (6) and a remote end of the pivoting lever (6) that is pivotally coupled to a housing (4), such that operation of the transmission actuator (8) biases the pivoting lever (9) and the locking rocker (6) into the locked position to lock the selector lever (1) in the parking lock position; and
   an unlocking actuator (15) communicating with the locking rocker (6) for biasing the locking rocker (6) from the locked position to the unlocked position thereby releasing the selector lever (1) from the parking lock position.

2. The actuating device according to claim 1, wherein the plurality of stable selector settings further includes both a neutral position and a reverse position.

3. An actuating device for selecting a control stage of a shift-by-wire gear shifting transmission, the actuating device comprising:
   a selector lever (1) being pivotable, about a pivot point (5), between a a stable park position (P), a stable reverse position (R), at least one stable drive position (D) and a stable neutral position (N), the selector lever (1) having a spring loaded catch mechanism (3) that communicates with a contoured surface to provide tactile response to the pivot position of the selector lever (1), the selector lever (1) further having a locking cam (12) such that, with an automatically engaged parking lock, the selector lever does not misleadingly remain in one of the drive position settings;
   the contoured surface comprises a plurality of distinct indentations which receive the catch mechanism (3), each of the distinct indentations corresponds to one of the stable park position (P), the stable reverse position (R), the stable drive position (D) and the stable neutral position (N), the catch mechanism (3) being receivable in the distinct indentations such that the selector lever (1) is stable in the respective stable position
   a locking rocker (6) being pivotally coupled to an end of a pivoting lever (9) to pivot between a locked position and an unlocked position, the locking rocker (6) having a first end (11) with a locking contour that, when in the locked position, is engagable with the locking cam (12) of the selector lever (1), and an opposite second end (13) with a locking contour that is engagable with an emergency release (14);
   a control wire (7) comprising a lock hook (18) which pivots to releasably engage a lock lug (19) of the pivoting lever (9), between the end of the pivoting lever (9) coupled to the locking rocker (6) and a remote end of the pivoting lever (6) that is pivotally coupled to a housing (4), such that operation of the transmission actuator (8) biases the pivoting lever (9) and the locking rocker (6) into the locked position to lock the selector lever (1) in the parking lock position; and
   an unlocking actuator (15) communicating with the locking rocker (6) for biasing the locking rocker (6) from the locked position to the unlocked position thereby releasing the selector lever (1) from the parking lock position.

* * * * *